(12) United States Patent
Hernandez et al.

(10) Patent No.: US 8,929,255 B2
(45) Date of Patent: Jan. 6, 2015

(54) SYSTEM AND METHOD FOR INPUT/OUTPUT VIRTUALIZATION USING VIRTUALIZED SWITCH AGGREGATION ZONES

(75) Inventors: Hendrich M. Hernandez, Round Rock, TX (US); Gaurav Chawla, Austin, TX (US); Robert L. Winter, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 129 days.

(21) Appl. No.: 13/331,450

(22) Filed: Dec. 20, 2011

(65) Prior Publication Data

US 2013/0156028 A1 Jun. 20, 2013

(51) Int. Cl.
*H04L 12/16* (2006.01)

(52) U.S. Cl.
USPC ........... 370/259; 370/359; 370/463; 370/465; 370/428; 370/429

(58) Field of Classification Search
USPC ........................................................ 370/359
See application file for complete search history.

(56) References Cited

U.S. PATENT DOCUMENTS

| | | | |
|---|---|---|---|
| 6,944,159 B1 * | 9/2005 | Fotedar et al. | 370/392 |
| 6,954,810 B2 * | 10/2005 | Delaney | 710/107 |
| 7,593,400 B2 | 9/2009 | Zelig et al. | |
| 7,616,653 B1 * | 11/2009 | Droux et al. | 370/420 |
| 7,684,423 B2 * | 3/2010 | Tripathi et al. | 370/412 |
| 7,729,617 B2 | 6/2010 | Sheth et al. | |
| 7,733,890 B1 * | 6/2010 | Droux et al. | 370/412 |
| 7,742,474 B2 * | 6/2010 | Droux et al. | 370/389 |
| 7,839,869 B1 | 11/2010 | Fotedar et al. | |
| 7,908,350 B2 * | 3/2011 | Duponchel et al. | 709/221 |
| 8,078,690 B2 * | 12/2011 | Shimozono et al. | 709/218 |
| 8,250,267 B2 * | 8/2012 | Logan | 710/74 |
| 2004/0028043 A1 * | 2/2004 | Maveli et al. | 370/392 |
| 2006/0123204 A1 * | 6/2006 | Brown et al. | 711/153 |
| 2007/0195780 A1 * | 8/2007 | Cabeca et al. | 370/392 |
| 2008/0288664 A1 * | 11/2008 | Pettey et al. | 710/5 |
| 2009/0323553 A1 | 12/2009 | Hernandez et al. | |
| 2010/0098098 A1 * | 4/2010 | Daines et al. | 370/401 |
| 2010/0166422 A1 * | 7/2010 | Shanbhag et al. | 398/45 |
| 2010/0303075 A1 * | 12/2010 | Tripathi et al. | 370/392 |
| 2011/0047256 A1 * | 2/2011 | Babu et al. | 709/223 |
| 2012/0093034 A1 * | 4/2012 | Kamath et al. | 370/255 |
| 2012/0201253 A1 * | 8/2012 | Cardona et al. | 370/401 |
| 2012/0243521 A1 * | 9/2012 | Zhang | 370/338 |

OTHER PUBLICATIONS

CISCO, "Configuring VTP" Catalyst 3550 Multilayer Switch Software Configuration Guide, pp. 1 -16. <http://www.cisco.com/en/US/docs/switches/lan/catalyst3550/software/release/12.1_19_ea1/configuration/guide/swvtp.html>.
U.S. Appl. No. 12/853,883, filed Aug. 10, 2010.

* cited by examiner

*Primary Examiner* — Ian N Moore
*Assistant Examiner* — Lakeram Jangbahadur
(74) *Attorney, Agent, or Firm* — Larson Newman, LLP

(57) ABSTRACT

A network switch includes a first network port, a second network port, and a port virtualization module associated with the first network port. The port virtualization module determines that a device coupled to the first network port includes a first virtual network interface and provides a second virtual network interface on the first network port. The second virtual network interface is associated with the first virtual network interface. The network switch provides an aggregation zone including the second network port, the first virtual network interface, and the second virtual network interface.

20 Claims, 3 Drawing Sheets

SYSTEM AND METHOD FOR INPUT/OUTPUT VIRTUALIZATION USING VIRTUALIZED SWITCH AGGREGATION ZONES

FIELD OF THE DISCLOSURE

The present disclosure generally relates to information handling systems, and more particularly relates to input/output virtualization using virtualized switch aggregation zones.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
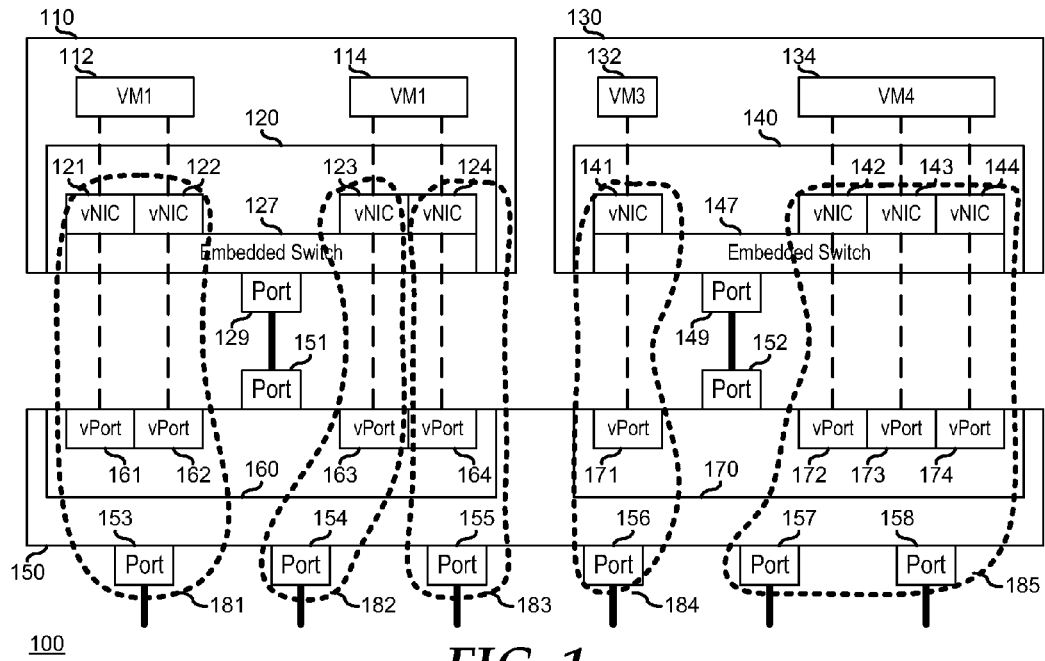
FIG. 1 is a block diagram of a switched environment according to an embodiment of the present disclosure.

FIG. 1 illustrates a switched environment 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, switched environment 100 includes a server 110, one or more additional servers 130, and a network switch 150. Server 110 represents an information handling system such as a stand-alone server, a rack mounted server, a blade server, or another type of information handling system. Server 110 includes a virtualization capable operating system, such as a virtual machine manager, that launches a virtual machine 112, and one or more additional virtual machines 114 on the hardware of the server. Server 110 also includes a network interface device 120. Network interface device 120 represents a hardware device of server 110, such as a network interface card (NIC), a converged network adapter (CNA), or another type of network device, that operates to connect the server to other devices. An example of network interface device 120 includes an Ethernet adapter, a Fibre Channel network device, a SCSI adapter, or another type of network interface device. In the illustrated embodiment, network interface device 120 is capable of providing one or more virtual ports that are associated with virtual machines launched by the virtualization capable operating system, in order to partition the network traffic on a physical port 129. For example, network interface device 120 can provide a 100 gigabit Ethernet (GbE) channel on port 129 that can be partitioned into a number of virtual channels of various bandwidths, and that are allocated to virtual machines 112 and 114, as needed or desired. As such, network interface device 120 includes virtual NICs (vNICs) 121 and 122 that are associated with virtual machine 112, and vNICs 123 and 124 that are associated with virtual machine 114. For example, vNICs 121 and 122 can be configured as 10 GbE partitions, thereby allocating 20 Gb of the 100 Gb bandwidth of physical port 129 to the virtual machine. In another example, vNIC 123 can be configured as a 10 GbE partition, and vNIC 124 can be configured as a 1 GbE partition. Here, network traffic on vNIC 124 can be reserved for low bandwidth applications, such as a printer or other such low bandwidth devices.

vNICs 121 through 124 are each identified by a unique identifier, such as a Media Access Control (MAC) address, a World Wide Name (WWN), or another unique identifier. Physical port 129 provides for communication between vNICs 121 through 124, and other devices that are connected to port 129 as needed or desired. Physical port 129 is also identified by a unique identifier, such as a MAC address or a WWN, and includes an embedded switch 127 that operates as a switch for traffic between virtual machines 112 and 114. As such, traffic between virtual machines 112 and 114 remains on server 110, and does not add to the network traffic bandwidth on port 129. In another embodiment, the virtualization capable operating system provides the virtual ports that are associated with virtual machines 112 and 114, and includes a virtual switch that operates similarly to embedded switch 127.

Server 130 is similar to server 110, including a virtualization capable operating system that launches virtual machines 132 and 134, and a network interface device 140 similar to network interface device 120, and that connects the server to other devices. Network interface device 140 provides vNIC 141 that is associated with virtual machine 132, and vNICs 142, 143, and 144 that are associated with virtual machine 134. vNICs 141 through 144 are each identified by a unique identifier, such as a MAC address or a WWN. Network interface device 140 also includes a physical port 149 similar to physical port 129, and an embedded switch 147 similar to embedded switch 127.

Network switch 150 includes physical ports 151 through 158. Physical port 151 is connected to physical port 129, and physical port 152 is connected to physical port 152. Physical ports 153 through 158 are connected to various downlink devices including other servers, network switches, storage devices, local area networks (LANs), other computing devices, or a combination thereof. Network switch 150 also includes port virtualization modules 160 and 170 that provide for the virtualization of the associated physical ports 151 and 152, respectively, such that the physical ports support virtual communication channels. As such, port virtualization module 160 includes virtual ports (vPorts) 161 through 164, and port virtualization module 170 includes vPorts 171 through 174. vPorts 161 through 164 are associated with vNICs 121 through 124, respectively, and vPorts 171 through 174 are associated with vNICs 141 through 144, respectively, such that network traffic that has the unique identifier for vNIC 121 as its destination address is routed over a virtual channel to vPort 161, and so on. An example of network switch 150 includes an Ethernet switch, a Fibre Channel switch, a SCSI switch, or another type of switch.

Network switch 150 operates to provide aggregation zones between physical ports. In a particular embodiment (not illustrated), two or more physical ports of network switch 150 can be connected to two or more network interface devices of a common server. The two or more physical ports can be aggregated into an aggregation zone with a third physical port. Here downstream network traffic that is received from the server, that is, from either one of the two or more physical ports, is routed to the third physical port, and upstream network traffic that is received from a downstream device on the third physical port is routed to the server via an available one of the two or more physical ports. In this way, network traffic from the server appears to the downstream devices as a single server endpoint.

Network switch 150 also operates to provide aggregation zones between physical ports and virtual ports. In the illustrated embodiment, network switch 150 provides aggregation zones 181 through 185. Aggregation zone 181 aggregates physical port 153 with vPorts 161 and 162, such that traffic that is received from virtual machine 112 via either one of vNICs 121 and 122 is routed to physical port 153, and upstream network traffic that is received from a downstream device on physical port 153 is routed to virtual machine 112 via an available one of vPorts 161 and 162. As a consequence of the formation of aggregation zone 181, no network traffic from any other vPort 163, 164, 171, 172, 173, or 174, or from any other physical port 152, 154, 155, 156, 157, or 158 will be routed to physical port 153 or to vPorts 161 and 162. Similarly, no network traffic from physical port 153 or from vPorts 161 and 162 will be routed to any other vPort 163, 164, 171, 172, 173, or 174, or to any other physical port 152, 154, 155, 156, 157, or 158. In like manner, aggregation zone 182 aggregates physical port 154 with vPort 163, aggregation zone 183 aggregates physical port 155 with vPort 164, aggregation zone 184 aggregates physical port 156 with vPort 171, and aggregation zone 185 aggregates physical ports 157 and 158 with vPorts 172, 173, and 174. Moreover, because vPorts 161 through 164 and 171 through 174 are directly associated with their respective vNICs 121 through 124 and 141 through 144, aggregation zones 181 through 185 are said to include their respective vNICs.

Network switch 150 also provides for the inheritance of port configurations based upon the aggregation zones. Thus considering aggregation zone 181, because port 153, vPorts 161 and 162, and vNICs 121 and 122 are aggregated together, the act of configuring port 153 can operate to cascade the configuration to vPorts 161 and 162, and to vNICs 121 and 122. For example, if physical port 153 is configured to support jumbo frames having a maximum transmission unit (MTU) size of 4500 bytes, vPorts 161 and 162 and vNICs 121 and 122 can be automatically configured to have an MTU size of 4500 bytes.

In a particular embodiment, one or more of servers 110 and 130 includes one or more additional network interface devices similar to network interface devices 120 and 140. In this case, the multiple network interface devices can be partitioned into vNICs as needed or desired to allocate the network traffic bandwidth of the multiple network interface devices. Moreover, vNICs from two or more different network interface devices can be associated with the same virtual machine. As such, network switch 150 also operates to provide aggregation zones that include vPorts that are associated with different physical ports, and that include vNICs from different network interface devices that are associated with a common virtual machine.

Figure 2:
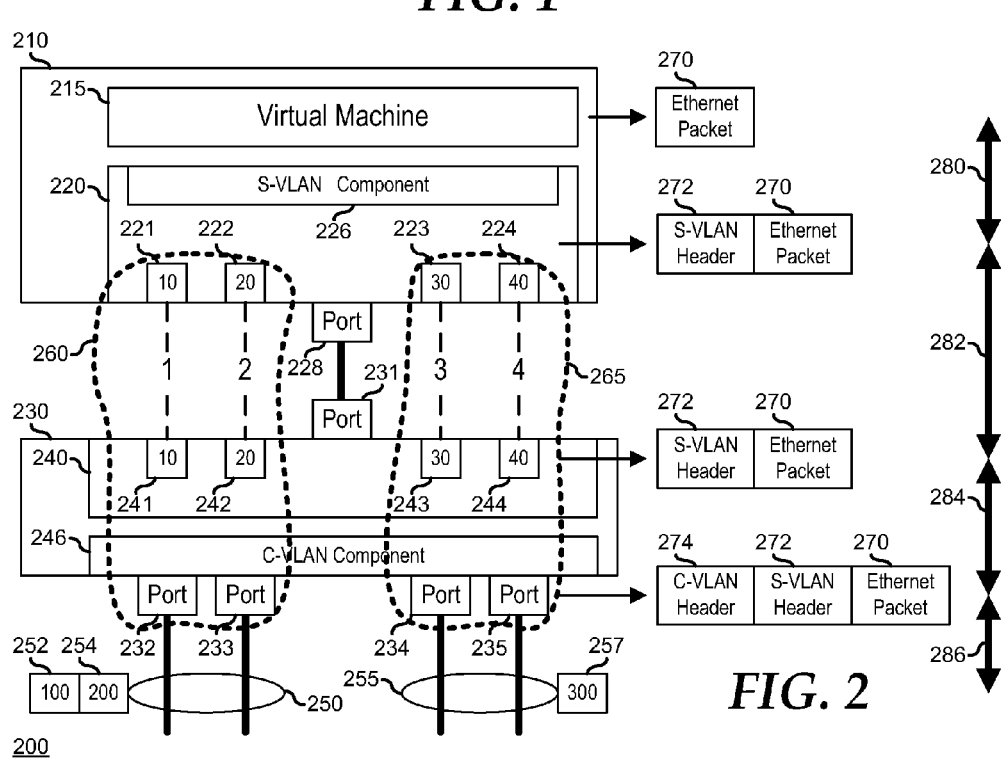
FIG. 2 is a block diagram of another switched environment according to an embodiment of the present disclosure.

FIG. 2 illustrates a switched environment 200 similar to switched environment 100, including a server 210 and a network switch 230. Server 210 includes a virtual machine 215 and a network interface device 220. Virtual machine 215 includes one or more applications that establishes virtual local area network (VLAN) sessions that permit secure communications between the application and a VLAN partner in another device that is connected to a port of network switch 230. Network interface device 220 represents a NIC, a vNIC, a CNA, or another type of network device that operates to connect the server 210 to the other devices. As such, network interface device 220 includes server source VLANs (S-VLANs) 221, 222, 223, and 224 that are associated with virtual machine 215. Network interface device 220 also includes an S-VLAN component 226, described below, and a physical port 228 similar to physical port 129.

Network switch 230 includes physical ports 231 through 235. Physical port 231 is connected to physical port 228, physical ports 232 and 233 are connected into a link aggregation group (LAG) 250 to one or more devices that provide resources to virtual machine 215, such as a LAN or an interprocessor communication (IPC) group, and physical ports 234 and 235 are connected in a LAG 255 to one or more devices that provide resources to virtual machine 215, such as a storage area network (SAN). LAG 250 is associated with client VLANs (C-VLANs) 252 and 254, and LAG 255 is associated with C-VLAN 257, described below. Network switch 230 also includes a port virtualization module 240 similar to port virtualization modules 160 and 170. Network switch 230 supports VLAN communication with virtual machine 215 by providing switch S-VLANs 241 through 244, such that physical port 231 supports S-VLAN channels 1 through 4 to server S-VLANs 221 through 224, respectively. Switch S-VLANs 241 through 244 are respectively associated with server S-VLANs 221 through 224, such that network traffic that is identified as pertaining to switch S-VLAN 241 is routed over S-VLAN channel 1 to server S-VLAN 221, and so on. Network switch 230 also includes C-VLAN component 246, described below.

Network switch 230 operates to provide aggregation zones 260 and 265 between physical ports 232 through 235 and switch S-VLANs 241 through 244. Aggregation zone 260 aggregates physical ports 232 and 233 with switch S-VLANs 241 and 242, such that traffic received from virtual machine 215 via either one of server S-VLANs 221 or 222 is routed to an available one of physical ports 232 or 233, and upstream network traffic that is received from a downstream device on either one of physical ports 232 or 233, and that is identified as pertaining to one of switch S-VLANs 241 or 242 is routed to virtual machine 215 via the identified S-VLAN channel 1 or 2. Similarly, aggregation zone 265 aggregates physical ports 234 and 235 with switch S-VLANs 243 and 244, such that traffic that is received from virtual machine 215 via either one of server S-VLANs 223 or 224 is routed to an available one of physical ports 234 or 235, and upstream network traffic that is received from a downstream device on either one of physical ports 234 or 235, and that is identified as pertaining to one of switch S-VLANs 243 or 244 is routed to virtual machine 215 via the identified S-VLAN channel 3 or 4.

The operation of switched environment 200 can be understood with respect to packet flows from virtual machine 215 to the devices connected downstream from network switch 230. In an exemplary embodiment, virtual machine 215 executes an application that establishes a VLAN session with a device on a LAN that is part of LAG 250. In response, server S-VLAN 221 is created on network interface device 220 and switch S-VLAN 241 is created on port virtualization module 240, thereby establishing S-VLAN channel 1, and C-VLAN 252 is created at physical ports 232 and 233. C-VLAN 252 is associated with a VLAN component in the device on the LAN. When the application needs to communicate to the device on the LAN, the application forms a packet 270 of data and provides it to network interface device 220. S-VLAN component 226 appends an S-VLAN header 272 to packet 270. S-VLAN header 272 includes a unique identifier, such as a MAC address, that is associated only with server S-VLAN 221 so that packet 270 is uniquely associated with server S-VLAN 221. Server S-VLAN 221 sends packet 270 with S-VLAN header 272 to switch S-VLAN 241 which forwards the packet to an available one of physical ports 232 or 233. C-VLAN component 246 appends a C-VLAN header 274 to the packet. C-VLAN header 274 includes a unique identifier that is associated only with physical ports 232 and 233 so that the packet is uniquely associated with traffic served by physical ports 232 and 233. The available one of physical ports 232 or 233 sends the packet to the device on the LAN. In the upstream direction, the device on the LAN provides a packet with the S-VLAN header information and the C-VLAN header information appended thereto. C-VLAN component 246 removes the C-VLAN header and forwards the packet to switch S-VLAN 241 which sends the packet over S-VLAN channel 1 to server S-VLAN 221. S-VLAN component 226 removes the S-VLAN header and forwards the packet to the application.

The application can establish a VLAN session with an IPC device that is part of LAG 250. In response, server S-VLAN 222 is created on network interface device 220 and switch S-VLAN 242 is created on port virtualization module 240, thereby establishing S-VLAN channel 2, and C-VLAN 254 is created at physical ports 232 and 233. C-VLAN 254 is associated with a VLAN component in the IPC device. Network traffic is then handled similarly to the network traffic over S-VLAN channel 1, as described above. The application can also establish two VLAN sessions with a SAN, one for primary data transfers, and one for data backups. As such, server S-VLAN 223 and switch S-VLAN 243 are created for the primary data transfers, thereby establishing S-VLAN channel 3, and server S-VLAN 224 and switch S-VLAN 243 are created for the data backups, thereby establishing S-VLAN channel 4. However, because both the primary data transfers and the data backups are targeted to the SAN, only one client VLAN, C-VLAN 257 is created at physical ports 234 and 235.

Data communicated in switched environment 200 thus occurs within one of several VLAN domains. In domain 280, between virtual machine 215 and S-VLAN component 226, there are no S-VLAN or V-LAN associations. Packets may include tags that are used by the application to identify how to use the packets, or may include internal VLAN tags within server 210. In domain 282, between server S-VLANs 221 through 224 and switch S-VLANs 241 through 244, the S-VLAN header information identifies the S-VLAN channel 1, 2, 3, or 4, over which the packet is to be transferred. In domain 284, between switch S-VLANs 241 through 244 and physical ports 232 through 235, the switch handles the routing according to the aggregation zones 260 and 265. Each aggregation zone 260 and 265 is assigned an aggregation zone identification (AZID). In domain 288, between physical ports 232 through 235 and the devices connected to the physical ports, the C-VLAN header information identifies the associated VLAN partner.

TABLE 1

Aggregation Zones

| S-VLAN Channel | Physical Port | MAC | S-VLAN | AZID | C-VLAN | Physical Port |
|---|---|---|---|---|---|---|
| 1 | 231 | A | 10 | 260 | 100 | 232/233 |
| 2 | 231 | B | 20 | 260 | 200 | 232/233 |
| 3 | 231 | C | 30 | 265 | 300 | 234/235 |
| 4 | 231 | D | 40 | 265 | 300 | 234/235 |

Table 1 shows an aggregation zone table that summarizes the above operation. Here the S-VLAN channels are shown in the first column, and the physical port that supports the S-VLAN channels is shown in the second column. The MAC address for each VLAN is given in the third column. The S-VLAN identifier, the AZID, the C-VLAN identifier, and the associated physical ports are shown in the fourth to seventh rows, respectively.

Figure 3:
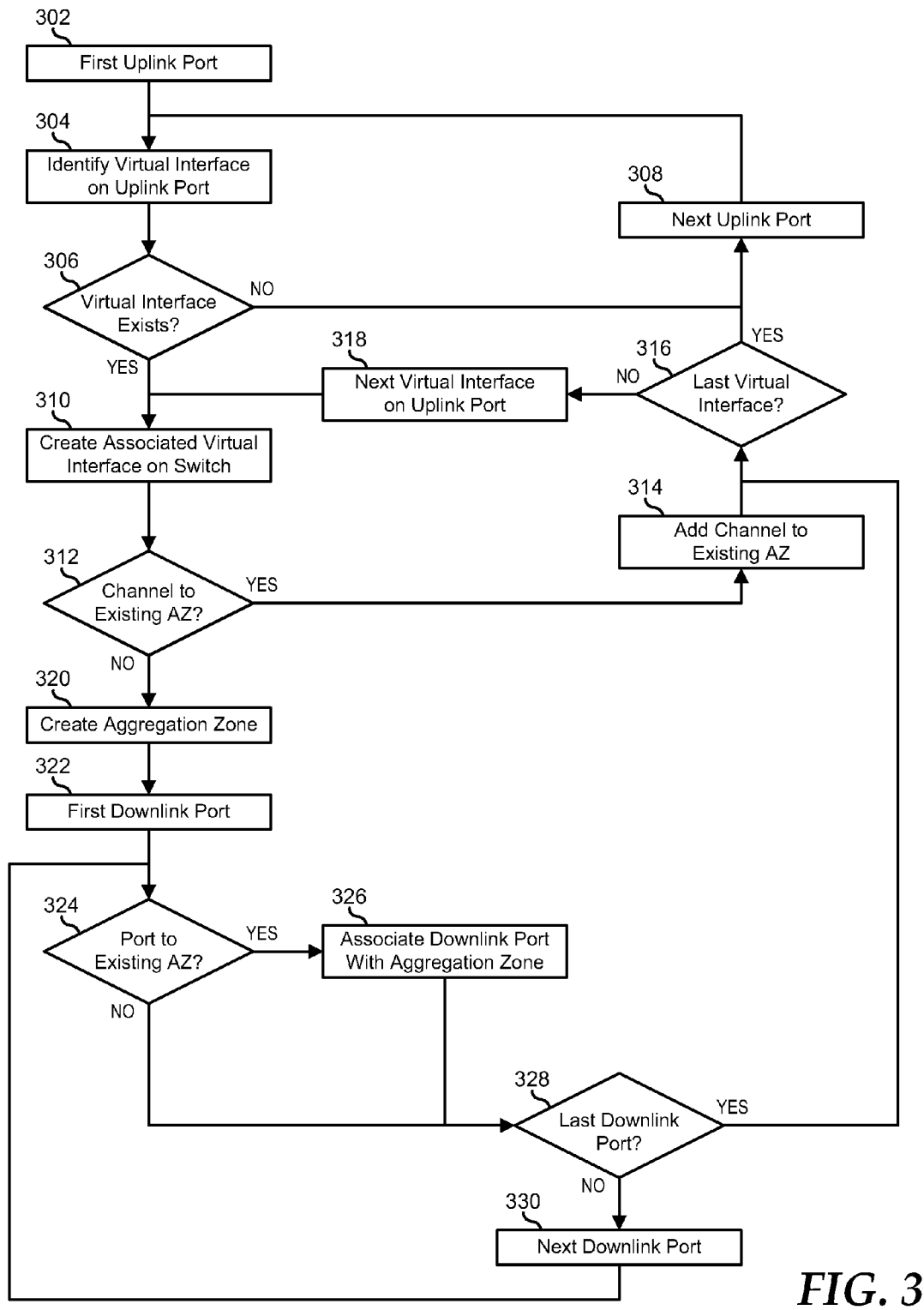
FIG. 3 is a flowchart illustrating a method of input/output virtualization using virtualized switch aggregation zones according to an embodiment of the present disclosure.

FIG. 3 illustrates a method of input/output virtualization using virtualized switch aggregation zones starting at block 302 where a first uplink port of a network switch is evaluated. For example, one of the physical ports of a network switch can be evaluated to determine if there is a virtual interface on the device connected to the physical port. A virtual interface is identified on the first uplink port in block 304. For example, the device connected to the uplink port can have a vNIC, a VLAN, or another type of virtual link associated therewith. A decision is made as to whether or not a virtual interface exists on the first port in decision block 306. If not, the "NO" branch of decision block 306 is taken, a next uplink port is selected in block 308, and the method returns to block 304 where a virtual interface is identified on the next uplink port. If a virtual interface exists on the first port, the "YES" branch of decision block 306 is taken, a virtual interface is created on the network switch, and the virtual interface on the network switch is associated with the virtual interface on the device connected to the upstream port in block 310, thereby creating a new virtual channel. For example, a vLink can be created on the physical port and the vLink can be associated with a vNIC on the upstream device, or a VLAN can be created on the physical port and the VLAN can be associated with a VLAN on the upstream device.

A decision is made as to whether or not the new virtual channel is to be part of an existing aggregation zone in decision block 312. If so, the "YES" branch of decision block 312 is taken, and the channel is added to the existing aggregation zone in block 314. For example, a channel consisting of a vNIC and a vPort can be added to an existing aggregation zone on the network switch, or a channel consisting of a pair of VLANs can be added. A decision is made as to whether or not the virtual interface of the device connected to the uplink port is the last virtual interface to be evaluated in decision block 316. If so, the "YES" branch of decision block 316 is taken, and the method returns to block 308 where a next uplink port is selected. If the virtual interface of the device connected to the uplink port is not the last virtual interface to be evaluated, the "NO" branch of decision block 316 is taken, a next virtual interface is identified on the uplink port in block 318, and the method returns to block 310 where a virtual interface is created on the network switch, and the virtual interface on the network switch is associated with the next virtual interface on the device connected to the upstream port.

If the new virtual channel is not to be part of an existing aggregation zone, the "NO" branch of decision block 312 is taken and a new aggregation zone that includes the new virtual channel is created in block 320. A first downlink port of the network switch is evaluated in block 322. A decision is made as to whether or not the first downlink port is to be part of the newly created aggregation zone in decision block 324. If so, the "YES" branch of decision block 324 is taken, and the downlink port is associated with the aggregation zone in block 326. After the downlink port is associated with the aggregation zone in block 326, or if the first downlink port is not to be part of the newly created aggregation zone and the "NO" branch of decision block 324 is taken, a decision is made as to whether or not the downlink port is the last downlink port of the network switch in decision block 328. If so, the "YES" branch of decision block 328 is taken, and the method returns to decision block 316 where a decision is made as to whether or not the virtual interface of the device connected to the uplink port is the last virtual interface to be evaluated. If the downlink port is not the last downlink port of the network switch, the "NO" branch of decision block 328 is taken, a next downlink port of the network switch is evaluated in block 330, and the method returns to decision block 324 where a decision is made as to whether or not the first downlink port is to be part of the newly created aggregation zone.

Figure 4:
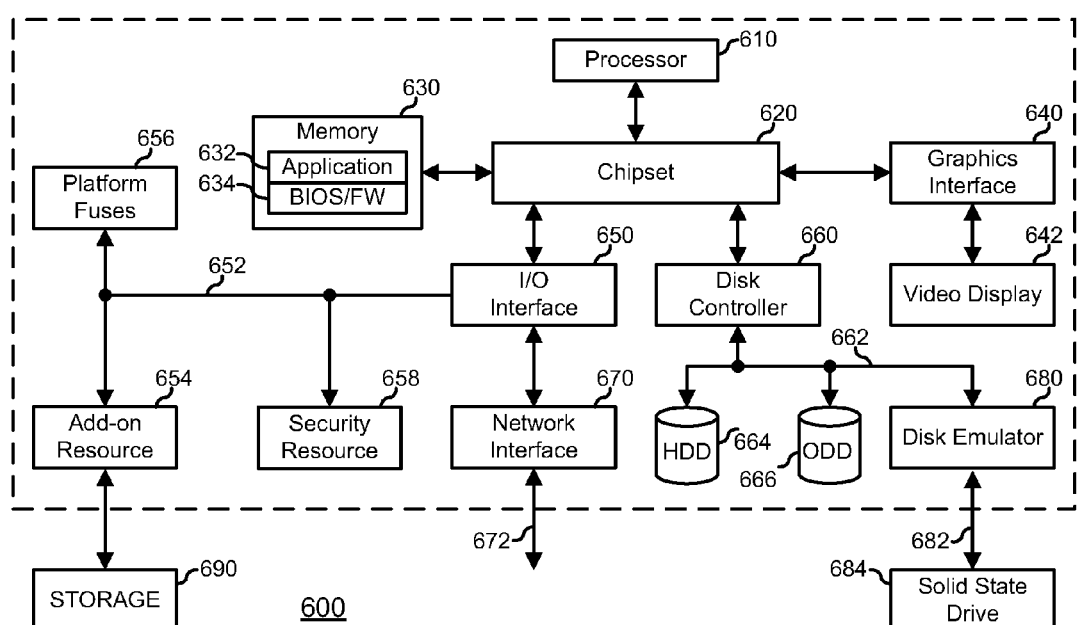
FIG. 4 is a block diagram illustrating an information handling system according to an embodiment of the present disclosure.

FIG. 4 is a block diagram illustrating an embodiment of an information handling system 400, including a processor 410, a chipset 420, a memory 430, a graphics interface 440, an input/output (I/O) interface 450, a disk controller 460, a network interface 470, and a disk emulator 480. In a particular embodiment, information handling system 400 is used to carry out one or more of the methods described herein. In another embodiment, one or more of the systems described herein are implemented in the form of information handling system 400.

Chipset 420 is connected to and supports processor 410, allowing the processor to execute machine-executable code. In a particular embodiment, information handling system 400 includes one or more additional processors, and chipset 420 supports the multiple processors, allowing for simultaneous processing by each of the processors and permitting the exchange of information among the processors and the other elements of the information handling system. Chipset 420 can be connected to processor 410 via a unique channel, or via a bus that shares information among the processor, the chipset, and other elements of information handling system 400.

Memory 430 is connected to chipset 420. Memory 430 and chipset 420 can be connected via a unique channel, or via a bus that shares information among the chipset, the memory, and other elements of information handling system 400. In another embodiment (not illustrated), processor 410 is connected to memory 430 via a unique channel. In another embodiment (not illustrated), information handling system 400 includes separate memory dedicated to each of the one or more additional processors. A non-limiting example of memory 430 includes static random access memory (SRAM), dynamic random access memory (DRAM), non-volatile random access memory (NVRAM), read only memory (ROM), flash memory, another type of memory, or any combination thereof.

Graphics interface 440 is connected to chipset 420. Graphics interface 440 and chipset 420 can be connected via a unique channel, or via a bus that shares information among the chipset, the graphics interface, and other elements of information handling system 400. Graphics interface 440 is connected to a video display 442. Other graphics interfaces (not illustrated) can also be used in addition to graphics interface 440 as needed or desired. Video display 442 includes one or more types of video displays, such as a flat panel display, another type of display device, or any combination thereof.

I/O interface 450 is connected to chipset 420. I/O interface 450 and chipset 420 can be connected via a unique channel, or via a bus that shares information among the chipset, the I/O interface, and other elements of information handling system 400. Other I/O interfaces (not illustrated) can also be used in addition to I/O interface 450 as needed or desired. I/O interface 450 is connected via an I/O interface 452 to one or more add-on resources 454. Add-on resource 454 is connected to a storage system 490, and can also include another data storage system, a graphics interface, a network interface card (NIC), a sound/video processing card, another suitable add-on resource or any combination thereof. I/O interface 450 is also connected via I/O interface 452 to one or more platform fuses 456 and to a security resource 458. Platform fuses 456 function to set or modify the functionality of information handling system 400 in hardware. Security resource 458 provides a secure cryptographic functionality and includes secure storage of cryptographic keys. A non-limiting example of security resource 458 includes a Unified Security Hub (USH), a Trusted Platform Module (TPM), a General Purpose Encryption (GPE) engine, another security resource, or a combination thereof.

Disk controller 460 is connected to chipset 420. Disk controller 460 and chipset 420 can be connected via a unique channel, or via a bus that shares information among the chipset, the disk controller, and other elements of information handling system 400. Other disk controllers (not illustrated) can also be used in addition to disk controller 460 as needed or desired. Disk controller 460 includes a disk interface 462. Disk controller 460 is connected to one or more disk drives via disk interface 462. Such disk drives include a hard disk drive (HDD) 464, and an optical disk drive (ODD) 466, and can include one or more disk drive as needed or desired. ODD 466 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 460 is connected to disk emulator 480. Disk emulator 480 permits a solid-state drive 484 to be coupled to information handling system 400 via an external interface 482. External interface 482 can include industry standard busses such as USB or IEEE 1394 (Firewire) or proprietary busses, or any combination thereof. Alternatively, solid-state drive 484 can be disposed within information handling system 400.

Network interface device 470 is connected to I/O interface 450. Network interface 470 and I/O interface 450 can be coupled via a unique channel, or via a bus that shares information among the I/O interface, the network interface, and other elements of information handling system 400. Other network interfaces (not illustrated) can also be used in addition to network interface 470 as needed or desired. Network interface 470 can be a network interface card (NIC) disposed within information handling system 400, on a main circuit board such as a baseboard, a motherboard, or any combination thereof, integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Information handling system 400 includes one or more application programs 432, and Basic Input/Output System and Firmware (BIOS/FW) code 434. BIOS/FW code 434 functions to initialize information handling system 400 on power up, to launch an operating system, and to manage input and output interactions between the operating system and the other elements of information handling system 400. In a particular embodiment, application programs 432 and BIOS/FW code 434 reside in memory 430, and include machine-executable code that is executed by processor 410 to perform various functions of information handling system 400. In another embodiment (not illustrated), application programs and BIOS/FW code reside in another storage medium of information handling system 400. For example, application programs and BIOS/FW code can reside in HDD 464, in a ROM (not illustrated) associated with information handling system 400, in an option-ROM (not illustrated) associated with various devices of information handling system 400, in storage system 490, in a storage system (not illustrated) associated with network channel 472, in another storage medium of information handling system 400, or a combination thereof. Application programs 432 and BIOS/FW code 434 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network switch, comprising:
a first network port;
a second network port; and a first port virtualization module associated with the first network port, the first port virtualization module operable to:
   determine that a first device coupled to the first network port includes a first virtual network interface; and
   provide a second virtual network interface on the first network port, the second virtual network interface being associated with the first virtual network interface;
wherein the network switch is operable to provide a first aggregation zone including the second network port, the first virtual network interface, and the second virtual network interface.

2. The network switch of claim 1, wherein further:
the first port virtualization module is operable to:
   determine that a second device coupled to the first network port includes a third virtual network interface; and
   provide a fourth virtual network interface on the first network port, the fourth virtual network interface being associated with the third virtual network interface; and
the network switch is operable to add the third virtual network interface and the fourth virtual network interface to the first aggregation zone.

3. The network switch of claim 1, further comprising:
a third network port;
a fourth network port; and
a second port virtualization module associated with the third network port, the second port virtualization module operable to:
   determine that a second device coupled to the third network port includes a third virtual network interface; and
   provide a fourth virtual network interface on the third network port, the fourth virtual network interface being associated with the third virtual network interface;
wherein the network switch is further operable to provide a second aggregation zone including the fourth network port, the third virtual network interface, and the fourth virtual network interface.

4. The network switch of claim 3, wherein further:
the second port virtualization module is operable to:
   determine that a third device coupled to the third network port includes a fifth virtual network interface; and
   provide a sixth virtual network interface on the third network port, the sixth virtual network interface being associated with the fifth virtual network interface;
wherein the network switch is further operable add the fifth virtual network interface and the sixth virtual network interface to the first aggregation zone.

5. The network switch of claim 1, further comprising:
a third network port;
wherein the network switch is further operable to add the third network port to the first aggregation zone.

6. The network switch of claim 1, wherein the first virtual network interface is a virtual network interface card, and the second virtual network interface is a virtual port.

7. The network switch of claim 1, wherein the first virtual network interface is a first virtual local area network and the second virtual network interface is a second virtual local area network.

8. The network switch of claim 7, wherein the second network port includes a third virtual local area network.

9. The network switch of claim 8, wherein the first and second virtual local area networks are source virtual local area networks, and the third virtual local area network is a client virtual local area network.

10. A method of providing aggregation zones in a network switch, comprising:
   determining, at the network switch, that a first device coupled to a first network port of the network switch includes a first virtual network interface;
   providing a second virtual network interface on the first network port, the second virtual network interface being associated with the first virtual network interface;
   providing a first aggregation zone on the network switch, the first aggregation zone including a second network port of the network switch, the first virtual network interface, and the second virtual network interface; and
   configuring the first virtual network interface and the second virtual network interface based upon a configuration of the second network port.

11. The method of claim 10, further comprising:
   determining that a second device coupled to the first network port includes a third virtual network interface;
   providing a fourth virtual network interface on the first network port, the fourth virtual network interface being associated with the third virtual network interface; and
   adding the third virtual network interface and the fourth virtual network interface to the first aggregation zone.

12. The method of claim 10, further comprising:
   determining that a second device coupled to a third network port of the network switch includes a third virtual network interface;
   providing a fourth virtual network interface on the third network port, the fourth virtual network interface being associated with the third virtual network interface; and
   providing a second aggregation zone on the network switch, the second aggregation zone including a fourth network port of the network switch, the third virtual network interface, and the fourth virtual network interface.

13. The method of claim 12, further comprising:
   determining that a third device coupled to the third network port includes a fifth virtual network interface;
   providing a sixth virtual network interface on the third network port, the sixth virtual network interface being associated with the fifth virtual network interface; and
   adding the fifth virtual network interface and the sixth virtual network interface to the first aggregation zone.

14. The method of claim 10, further comprising:
   adding a third network port of the network switch to the first aggregation zone.

15. The method of claim 10, wherein the first virtual network interface is a virtual network interface card, and the second virtual network interface is a virtual port.

16. The method of claim 10, wherein:
   the first virtual network interface is a first virtual local area network;
   the second virtual network interface is a second virtual local area network; and
   the second port includes a third virtual local area network.

17. The method of claim 16, wherein the first and second virtual local area networks are source virtual local area networks, and the third virtual local area network is a client virtual local area network.

18. A non-transitory storage medium including instructions for carrying out a method, the method comprising:

determining that a first device coupled to a first network port of the network switch includes a first virtual network interface;

providing a second virtual network interface on the first network port, the second virtual network interface being associated with the first virtual network interface; and providing a first aggregation zone on the network switch, the first aggregation zone including a second network port of the network switch, the first virtual network interface, and the second virtual network interface.

19. The storage medium of claim 18, the method further comprising:

determining that a second device coupled to the first network port includes a third virtual network interface;

providing a fourth virtual network interface on the first network port, the fourth virtual network interface being associated with the third virtual network interface; and adding the third virtual network interface and the fourth virtual network interface to the first aggregation zone.

20. The storage medium of claim 18, the method further comprising:

determining that a second device coupled to a third network port of the network switch includes a third virtual network interface;

providing a fourth virtual network interface on the third network port, the fourth virtual network interface being associated with the third virtual network interface; and providing a second aggregation zone on the network switch, the second aggregation zone including a fourth network port of the network switch, the third virtual network interface, and the fourth virtual network interface.

* * * * *